(No Model.)
J. S. WOOLSEY.
LAWN SPRINKLER.
No. 390,427. Patented Oct. 2, 1888.
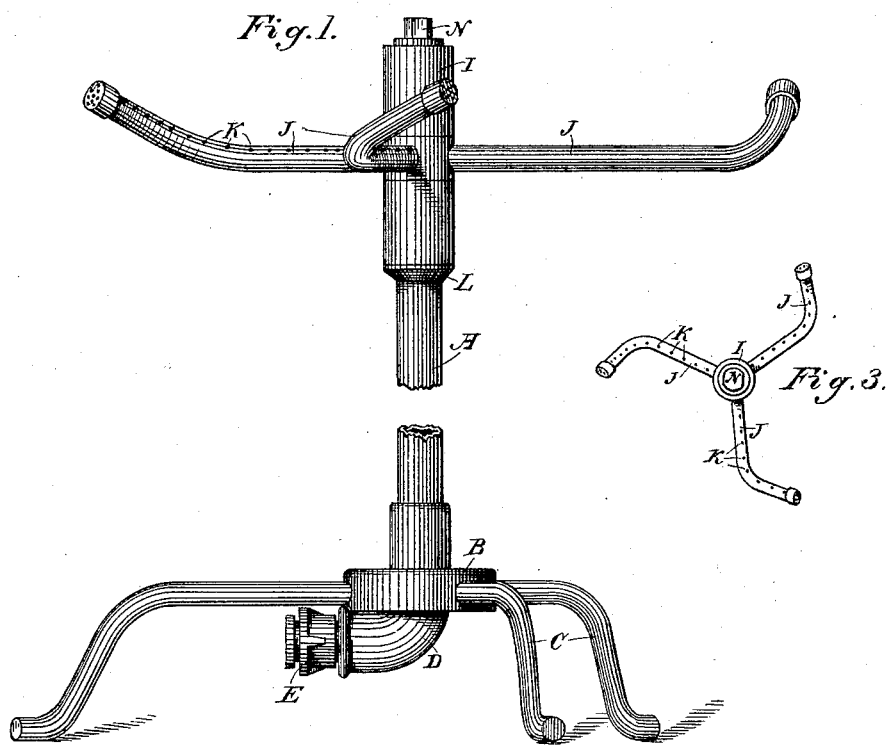
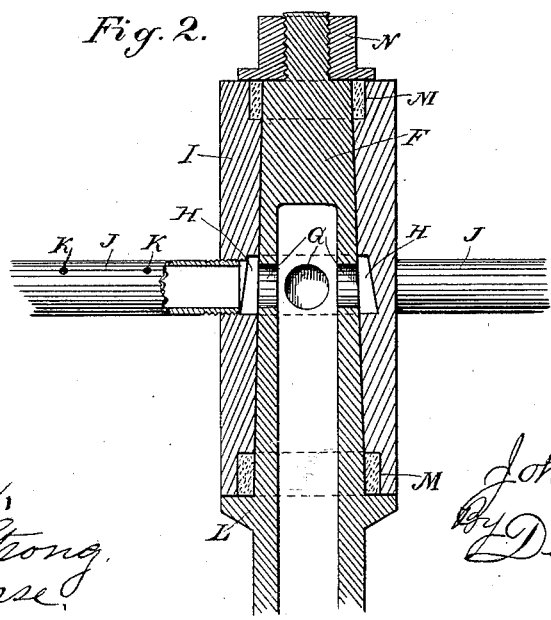
Witnesses,
Geo. H. Strong.
J. H. Nurse.
Inventor,
John S. Woolsey,
By Dewey & Co.
attys

UNITED STATES PATENT OFFICE.

JOHN S. WOOLSEY, OF GILROY, CALIFORNIA.

LAWN-SPRINKLER.

SPECIFICATION forming part of Letters Patent No. 390,427, dated October 2, 1888.

Application filed November 25, 1887. Serial No. 256,165. (No model.)

*To all whom it may concern:*

Be it known that I, JOHN S. WOOLSEY, of Gilroy, Santa Clara county, State of California, have invented an Improvement in Lawn-Sprinklers; and I hereby declare the following to be a full, clear, and exact description of the same.

My invention relates to certain improvements in devices for sprinkling lawns; and it consists of a vertical stand-pipe having a tripod or legs upon which it is supported and a coupling to which the hose may be attached, in combination with a cylindrical head having a tapering vertical hole extending axially through it and fitting a corresponding tapering shaft at the top of the stand-pipe.

Chambers are formed at each end of the cylindrical head to receive packing, and a peculiarly-shaped angular or conical chamber around the center of the interior chamber corresponds with transverse holes made in the sleeve upon which it turns, so that water is admitted from these holes into the bent perforated arms which project outwardly from the rotary head, and are provided with holes or openings, so as to rotate by reactionary force of the escaping water and distribute the same over the surface to be wetted.

Referring to the accompanying drawings for a more complete explanation of my invention, Figure 1 is a view of the device. Fig. 2 is a longitudinal vertical section taken through the axis of the rotary head and showing the interior spindle upon which it turns. Fig. 3 is a plan view of the arms.

A is a vertical hollow stand-pipe, having at the lower end a collar, B, with legs or supports C projecting outwardly, and bent so as to support the pipe a short distance above the ground. An elbow, D, is attached to the lower end of the pipe, and a coupling, E, serves for the purpose of connecting a hose to the pipe for the admission of water. The upper end pipe has formed upon or secured to it a vertical and slightly-tapering hollow spindle, F, with radial holes G at about its central portion, so as to allow the water to escape outwardly at this point into the chamber H, which is formed around the interior of the cylindrical rotary head I. This head has two, three, or more arms, J, extending outwardly from its central portion, having their inner ends opening into the chamber H, before described, and their outer ends provided with caps which are perforated with small holes for the escape of water. I have shown these arms in the present case as bent into a curve, so that the outer ends are tangential to a circle having the rotating head I as a center, and they are also curved slightly upward, so that water which is discharged from the outer ends will be thrown upwardly and outwardly, and the arms and head will be caused to rotate by the reactionary force of the escaping water. Other holes, K, are made along the arms, so that the water will be distributed equally from the central point to the circumference of the circle about which it is thrown.

The important feature in my device is the rotary head I, which is made of considerable length, so as to have an even bearing upon the central spindle.

L is a collar at the base of that portion of the spindle upon which the cylindrical head fits and by which it is supported. The interior of this cylindrical head is filled with Babbitt metal, which forms a tapering sleeve which just fits the tapering spindle F, about which it turns.

The upper and lower ends of the sleeve I are countersunk or chambered, as shown at M, so that packing material of any suitable description may be placed therein. The lower end of the sleeve resting upon the collar L retains the packing in place and forms a sufficiently tight joint to prevent water from escaping excessively at this point. Upon the upper end of the spindle, which is closed, is formed a screw, and a nut, N, fits upon this screw and closes the countersink or chamber at the upper end of the sleeve, thus retaining the packing at this point in place and making a joint as tight as is necessary. The central chamber, H, which is formed within the cylindrical sleeve I, is made, as shown, in the form of a cone, with the base toward the bottom and the inclined sides extending upwardly therefrom. The water escaping from the holes G in the spindle and pressing against the inclined sides of the chamber H tends to lift the cylindrical head slightly upon the tapering spindle F, and thus prevents its binding so closely as not to work well, while at the same time the great length of the head and the Babbitt lining turning upon the tapering spindle will make so tight a joint that but little if any water will escape, except through the arms which cause it to rotate.

I am aware a sprinkler has been constructed with radial perforated arms united with a hub having a chamber communicating with said arms and the fixed standard or discharge pipe. I therefore do not broadly claim such a construction, but limit myself to the specific construction and combination claimed, including the cylindrical head with its central conical chamber, whereby the force of the water pressing upon the inclined sides of said conical chamber tends to lift the cylindrical head slightly upon its tapering spindle and thus prevent binding—a result not obtained by the use of a chamber having straight parallel sides.

Having thus described my invention, what I claim as new, and desire to secure by Letters Patent, is—

The hollow vertical stand-pipe with the supporting-legs, elbow and coupling at the bottom, and the tapering perforated spindle with the supporting-collar at its base, in combination with the cylindrical head, the chamber for packing at each end, and the central conical chamber corresponding with the radial perforations in the spindle and with the radial perforated arms which extend outwardly from the head, substantially as herein described.

In witness whereof I have hereunto set my hand.

JOHN S. WOOLSEY.

Witnesses:
JAMES B. CALEF,
JAMES A. CLAYTON.